United States Patent
Vardimon et al.

(10) Patent No.: US 12,430,947 B2
(45) Date of Patent: Sep. 30, 2025

(54) SOFT FUNCTION BASED SIMILARITY-EMBEDDING BINARIZATION

(71) Applicant: CORSIGHT.AI, Tel Aviv (IL)

(72) Inventors: Ran Vardimon, Tel Aviv (IL); Yarden Yaniv, Tel Aviv (IL)

(73) Assignee: CORSIGHT.AI, Tel Aviv (IL)

( * ) Notice: Subject to any disclaimer, the term of this patent is extended or adjusted under 35 U.S.C. 154(b) by 635 days.

(21) Appl. No.: 17/652,669

(22) Filed: Feb. 25, 2022

(65) Prior Publication Data

US 2022/0270400 A1   Aug. 25, 2022

Related U.S. Application Data

(60) Provisional application No. 63/200,268, filed on Feb. 25, 2021.

(51) Int. Cl.
| | |
|---|---|
| *G06V 40/16* | (2022.01) |
| *G06N 7/01* | (2023.01) |
| *G06V 10/774* | (2022.01) |
| *G06V 10/82* | (2022.01) |

(52) U.S. Cl.
CPC ............. *G06V 40/168* (2022.01); *G06N 7/01* (2023.01); *G06V 10/774* (2022.01); *G06V 10/82* (2022.01); *G06V 40/172* (2022.01)

(58) Field of Classification Search
CPC .... G06V 40/168; G06V 10/82; G06V 40/172; G06N 3/04; G06N 3/045; G06N 3/08; G06F 17/18; G06F 18/2321
See application file for complete search history.

(56) References Cited

U.S. PATENT DOCUMENTS

| | | | |
|---|---|---|---|
| 2015/0278156 A1* | 10/2015 | Ambai ................... | G06N 20/00 708/650 |
| 2018/0101742 A1* | 4/2018 | Burge ................ | G06F 16/5838 |
| 2021/0150313 A1* | 5/2021 | Roy ....................... | G06N 3/045 |
| 2021/0200993 A1* | 7/2021 | Chen ...................... | G06V 10/82 |
| 2022/0301288 A1* | 9/2022 | Higuchi ................ | G06V 10/82 |

* cited by examiner

*Primary Examiner* — Nay A Maung
*Assistant Examiner* — Dustin Bilodeau
(74) *Attorney, Agent, or Firm* — Reches Patents

(57) ABSTRACT

Computerized systems, and method and computer readable media. The method may include receiving, by a neural network, input face visual information; wherein the neural network comprises multiple convolutional layers, an embedding layer and one or more conversion layers; generating, by the embedding layer, a face recognition (FR) feature vector that comprises multiple FR feature elements; applying a soft function on the multiple FR feature elements, by the one or more conversion layers, to provide a converted FR feature vector that comprises multiple converted FR feature elements that are non-binary; and generating a binary representation of the face recognition features based on the converted FR feature vector.

21 Claims, 12 Drawing Sheets

500

SOFT FUNCTION BASED SIMILARITY-EMBEDDING BINARIZATION

BACKGROUND

In the context of machine learning, an embedding is a low-dimensional, learned continuous vector representation of discrete variables (elements—one element per feature) into which you can translate high-dimensional vectors. The embedding usually includes hundreds of elements and each element may include multiple bits.

In the context of face recognition—a face recognition (FR) embedding (also referred to as embedding or a FR feature vector) may include multiple FR feature elements—that may be multibit floating numbers.

In order to perform facial recognition, a FR embedding of an image of a face is compared to many reference FR embeddings in order to find the best matching reference RF embedding (if such exists).

The comparison includes calculating the similarity between the FR embedding and each of the reference FR embeddings is calculated—by calculating an inner product. When the FR embedding includes hundreds of multibit floating numbers and the number of reference FR embeddings is large (may exceed hundreds, thousands, tens of thousands, hundred thousands, millions, and more)—this process is time and resource consuming.

There is a growing need to provide an efficient method for facial recognition.

SUMMARY

There may be provided computerized systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

Figure 1:
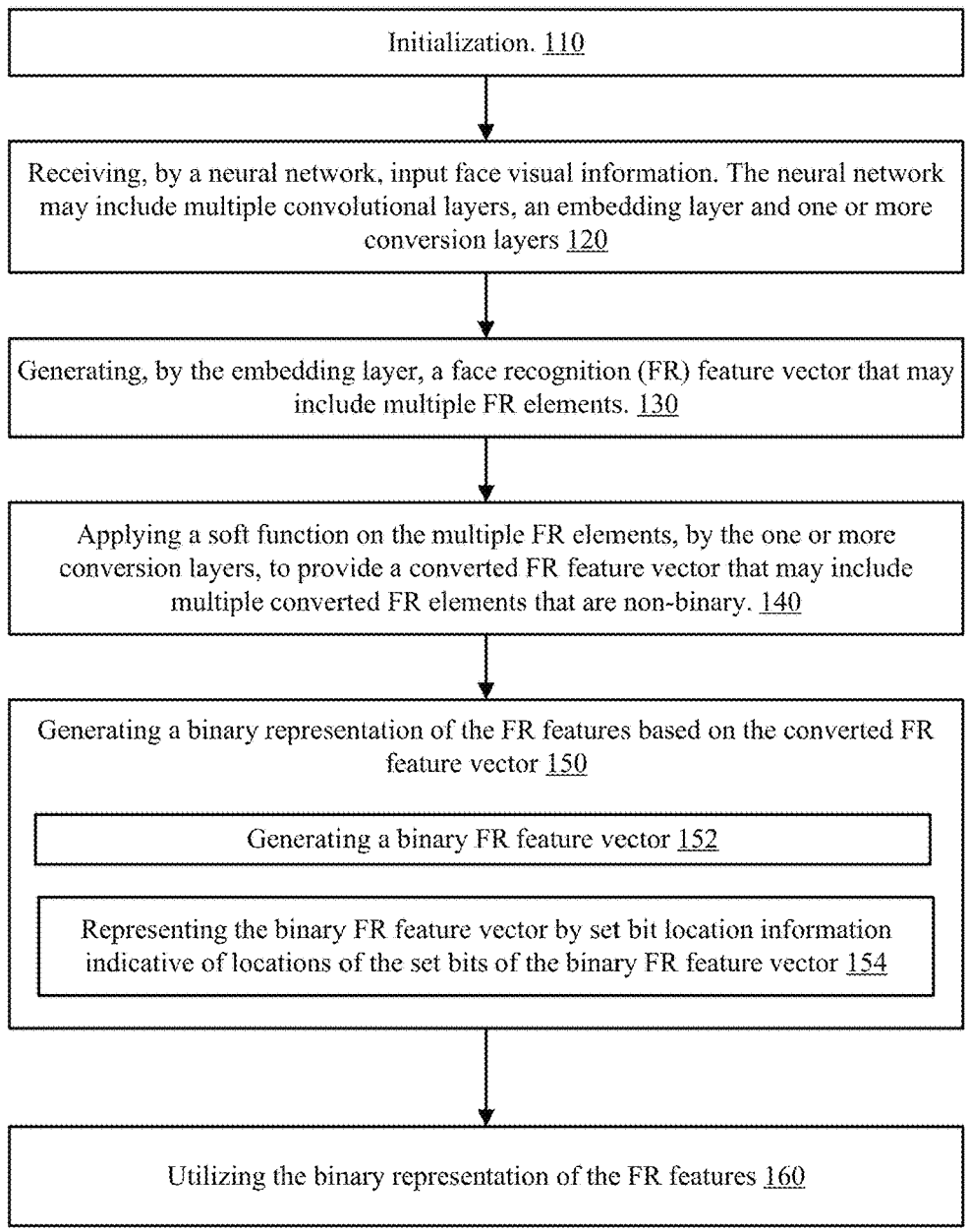
FIG. 1 illustrates an example of a method.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or computerized system capable of executing the method and/or to a non-transitory computer readable medium that stores instructions for executing the method.

Any reference in the specification to a computerized system or device should be applied mutatis mutandis to a method that may be executed by the computerized system, and/or may be applied mutatis mutandis to non-transitory computer readable medium that stores instructions executable by the computerized system.

Any reference in the specification to a non-transitory computer readable medium should be applied mutatis mutandis to a device or computerized system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of computerized systems, units, components, processors, sensors, illustrated in the specification and/or drawings may be provided.

Any reference to any of the term "comprising" may be applied mutatis mutandis to the terms "consisting" and "consisting essentially of".

Any reference to any of the term "consisting" may be applied mutatis mutandis to the terms "comprising" and "consisting essentially of".

Any reference to any of the term "consisting essentially of" may be applied mutatis mutandis to the terms "comprising" and "comprising".

The term "substantially" means insignificant deviation—for example differences that do not exceed few percent of a value, differences that are below the accuracy and/or resolution related to the face recognition process. What is substantially may be defined in any manner.

There may be provided a computerized system, a method and a non-transitory computer readable medium for compact representation of face recognition features.

The representation of face recognition features (also referred to as signature) is compact in the sense that it may be binary and allocate one or only a few bits per element. Additional size reduction may be obtained when the representation of face recognition (FR) features is a set bit location information indicative of locations (also referred to as identifiers or IDs) of the set bits of the binary FR feature vector. The In cases where most of the bits of the binary FR feature vector are zero-valued—using the set bit location information can dramatically reduce the size of the representation.

In addition, when using set bit location information, the complexity of similarity testing is reduced by replacing embedding cosine similarity test to intersection between the set bits of different signatures.

Unlike conventional wisdom which treats embeddings as vectors in a multidimensional space, when using the set bit location information—it is possible to treat the signature as a collection of active features (set bits). In analogy to natural language processing (NLP), a document can be defined as the vector of words existing in the document—here, the "words" are the binary features. This realization that the binary signatures can be treated as textual-like features is a basis for adapting very efficient matching algorithms from textual search-engine domains.

This approach may reduce (depending on the size of the embedding, the number of entries in the database and the bit allocated per element) complexity by one or more orders of magnitude.

The reduce complexity of the search as well as the reduced size of the set bit location information—also improves memory utilization—for example by allowing smaller memories to store the entire reference database, by allowing smaller cache memory to store larger number of reference set bit location information (in relation to storing the entire reference embeddings)—which also accelerates the calculation—by reducing the need to obtain non cached information during searches. This is a significant benefit as cache memory is typically a severe bottleneck limited efficient calculation with typical hardware (Central Processing Unit or Graphic Processing Unit) up to the point there is a need to utilize dedicated hardware accelerators for embedding similarity-search.

FIG. 1 illustrates method 100 for compact representation of face recognition features.

Method 100 may start by step 110 of initialization.

Step 110 may include obtaining a neural network. Step 110 may include training the neural network, configuring the neural network based on outcome of a training process, or receiving a trained neural network.

Step 110 may be followed by step 120 of receiving, by a neural network, input face visual information. The neural network may include multiple convolutional layers, an embedding layer (or more than one embedding layers) and one or more conversion layers. An embedding layer may be a fully connected layer. An embedding layer is a layer that outputs the FR feature vector.

Step 120 may be followed by step 130 of generating, by the embedding layer, a face recognition (FR) feature vector that may include multiple FR feature elements.

The FR feature vector may also be referred to as embeddings. It may include multiple FR feature elements—one per feature, and each FR feature element may be a floating number of multiple bits. The FR feature vector may include, for example, hundreds of FR feature elements—for example 512 FR feature elements. The number of FR feature elements may be lower than 513 or may exceed 512.

Step 130 may be followed by step 140 of applying a soft function on the multiple FR feature elements, by the one or more conversion layers, to provide a converted FR feature vector that may include multiple converted FR feature elements that are non-binary.

The multiple converted FR feature elements are non-binary in the sense that their values may differ from 0 and 1.

The soft function increases the probability that the values of the converted FR-elements are about multiple discrete values. About may mean in the proximity of the multiple discrete values—for example at a distance that is a fraction (for example less than 0.2 or 0.1) of a distance between two adjacent discrete values.

The multiple discrete values may be zero and one, the multiple discrete values may be minus one, zero and one, or any combination (of integer and/or non-integer values) of multiple values.

Each FR feature element is associated with a FR feature element probability density function. Each converted FR feature element is associated with a converted FR feature element probability density function. The applying of the soft function causes the converted FR feature element probability density function to have a higher distribution function density around the multiple discrete values in relation to the FR feature element probability density function.

The soft function may provide, for example, semi-binary values or semi-trinary-values. The soft function may provide semi-n'ray values—wherein n is an integer that exceeds one.

The soft function increases the accuracy of the binary representation—as the binarization phase of step 150 is applied on variables that are closer to the n-ary values.

Step 140 may be followed by step 150 of generating a binary representation of the FR features based on the converted FR feature vector.

Step 150 may include step 152 of generating a binary FR feature vector.

Step 150 may also include step 154 of representing the binary FR feature vector by set bit location information indicative of locations of the set bits of the binary FR feature vector.

In many cases most of the converted FR feature elements are zero-valued—and the set bit location information may be very compact—and yields in further compression.

Step 150 may include, for example, generating a trinary FR feature vector, and converting the trinary feature vector to a binary FR feature vector—for example by representing each value (of −1, 0 and 1) by a pair of binary bits. For example value zero is encoded to "00", value minus one is encoded to "01" and value one is encoded to "10".

Step 154 may include generating set bit location information of said encoded values.

Step 150 may be executed by entity that does not belong to the neural network. This entity may not be used during the training of the neural network. This may allow the neural network to generate non-binary outputs and also to be trained while outputting non-binary outputs—which increases the accuracy of the training and inference phases.

Step 150 may be followed by step 160 of utilizing the binary representation of the FR features.

Step 160 may include searching for a similar reference face out of multiple reference faces that are represented by reference binary representations of FR features.

Step 160 may include adding the binary representation of the FR features as a reference to a database of reference binary representations of FR features.

Figure 2:
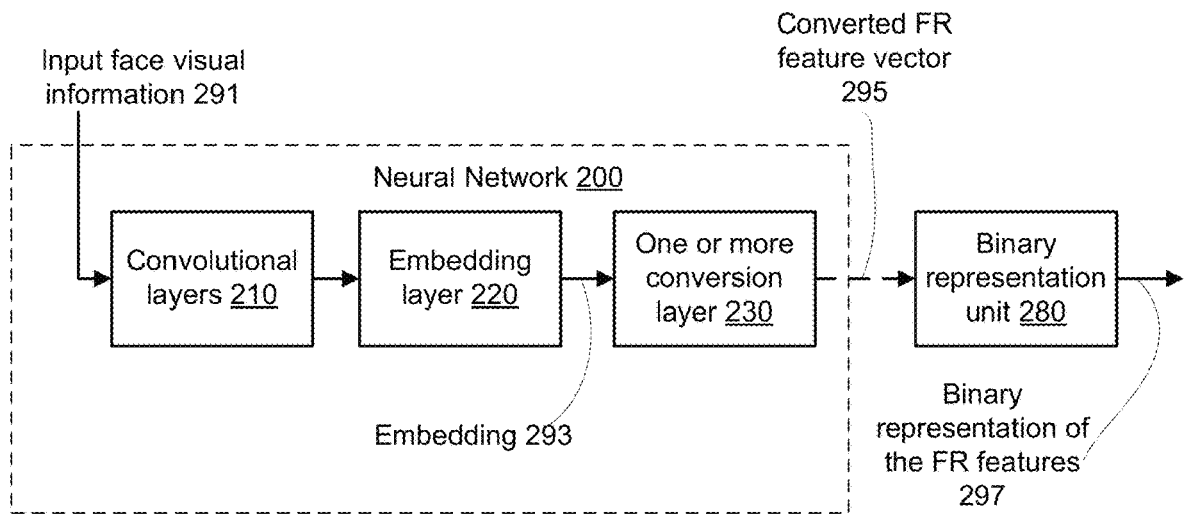
FIG. 2 illustrates an example of a generation of a binary representation of FR features.

FIG. 2 illustrates an example of a neural network 200 and a binary representation unit 280.

The neural network may be implemented by a processor such as a neural network processor, may be implemented as a set of commands, and the like.

The neural network 200 include convolutional layers 210, an embedding layer 220 and one or more conversion layers 230. The neural network 200 may include additional layers. The neural network may receive input face visual information 291, the convolution layers 210 may be followed by an embedding layer 220 that outputs face recognition (FR) feature vector that may include multiple FR feature elements such as embedding 293. The face recognition (FR) feature vector is provided to the one or more conversion layer 230 that outputs a converted FR feature vector 295. The binary representation unit 280 may receive converted FR feature vector 295 and generate a binary representation of the FR features 297.

Figure 3:
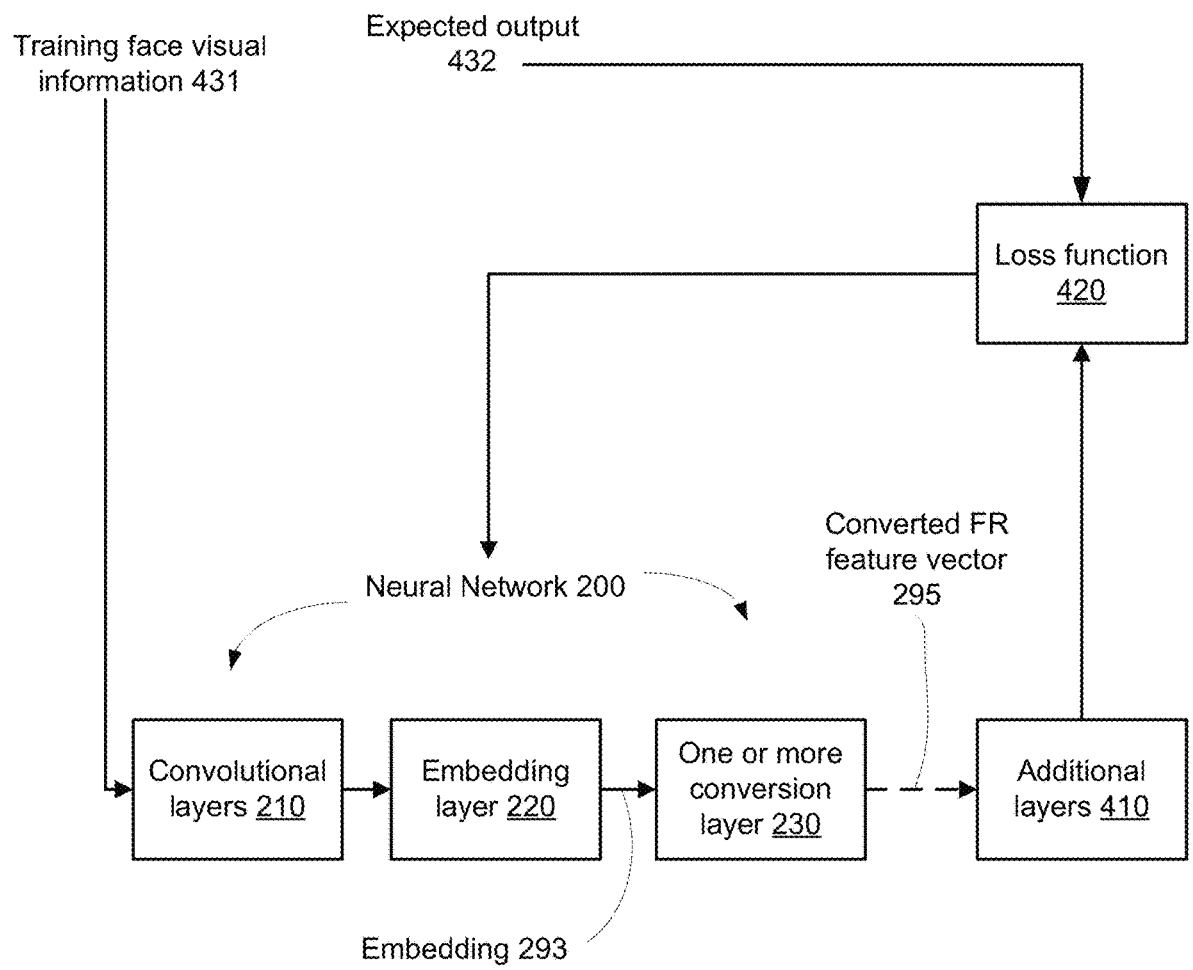
FIG. 3 is an example of a training process.

FIG. 3 illustrates an example of a supervised training of neural network 200 (illustrated as including convolutional layers 210, embedding layer 220 and one or more conversion layer 230), additional layers 410 (that are not used during inference), loss function 420. During the training process the neural network is fed with training face visual information 431, and the loss function 420 is fed by the output of the additional layers 410 and by expected output 432 (being supervised training—the expected output is the expected output of the other neural network 410—one being fed with the training face visual information 431).

Figure 4:
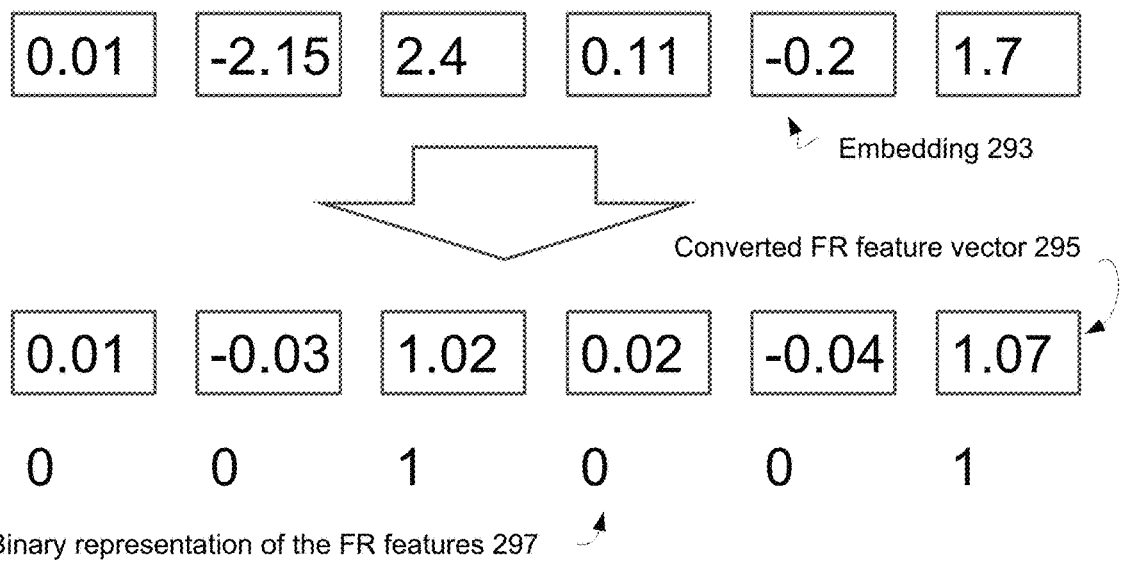
FIG. 4 illustrates an example of conversions and soft functions.
Figure 4:
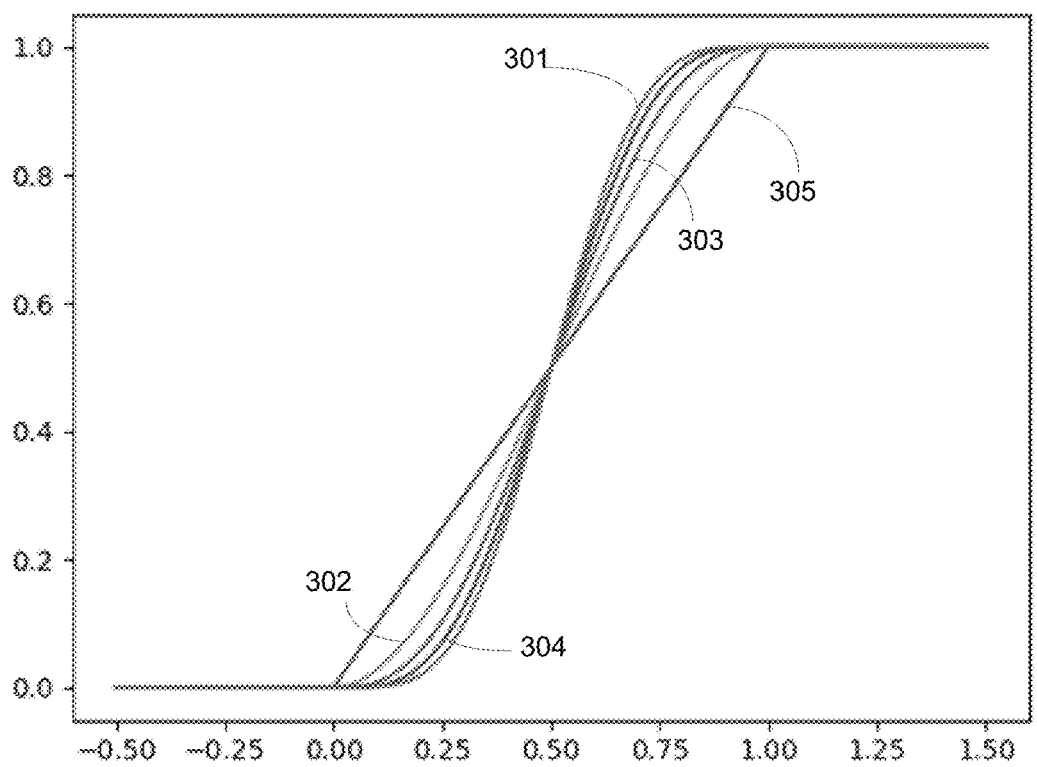

FIG. 4 illustrates an example of embedding 293 that is converted to a converted FR feature vector 295 such as a semi-binary converted FR feature vector that is then converted to a binary representation of the FR features 297.

FIG. 4 also illustrates examples of soft functions 301, 302, 303, 304 and 305. The non-linear soft functions 301-304 may provide a better convergence. The x-axis illustrates values of the FR feature elements while the y-axis illustrates values of the converted FR feature elements.

Figure 5:
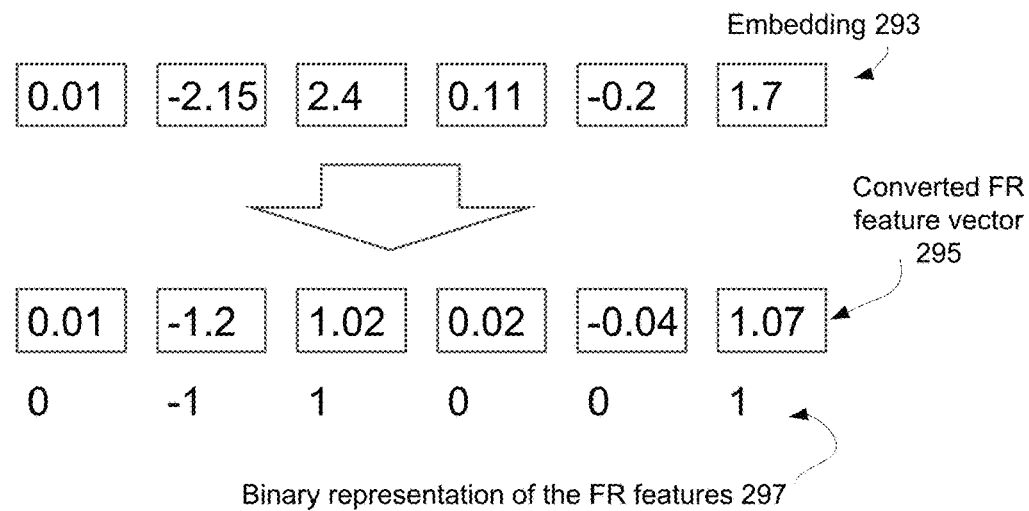
FIG. 5 illustrates an example of conversions and soft functions.
Figure 5:
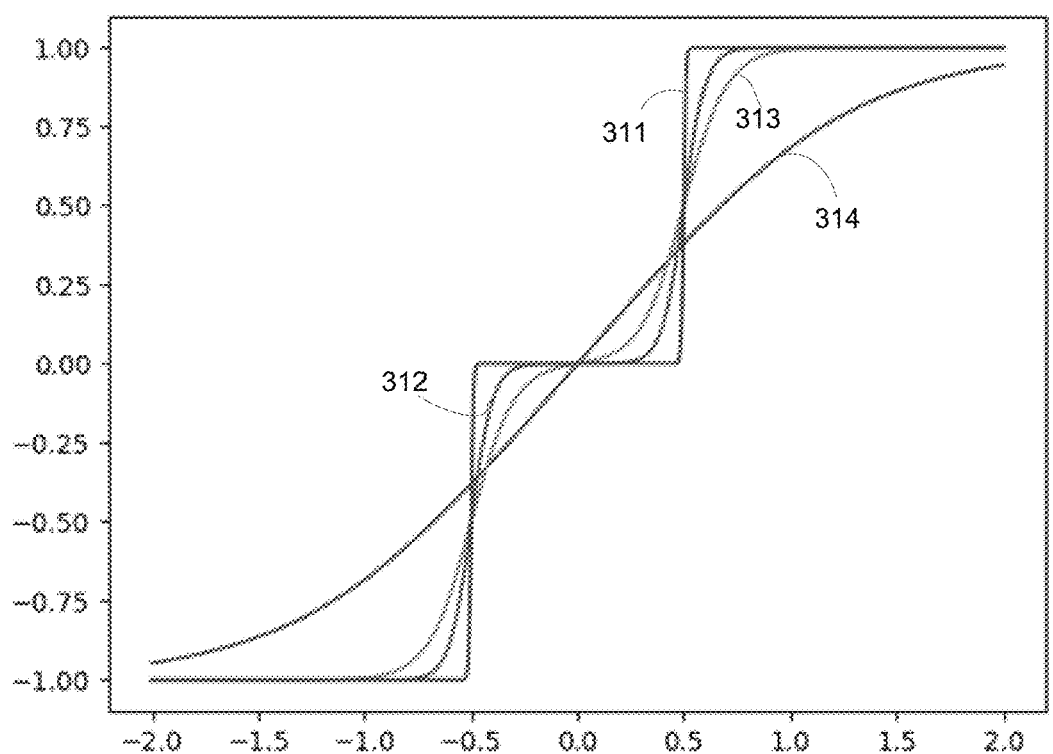

FIG. 5 illustrates an example of embedding 293 that is converted to a converted FR feature vector 295 such as a semi-trinary converted FR feature vector that is then converted to a binary representation of the FR features 297.

FIG. 5 also illustrates examples of soft functions 311, 312, 313 and 314. The non-linear soft functions 312-314 may provide a better convergence.

Figure 6:
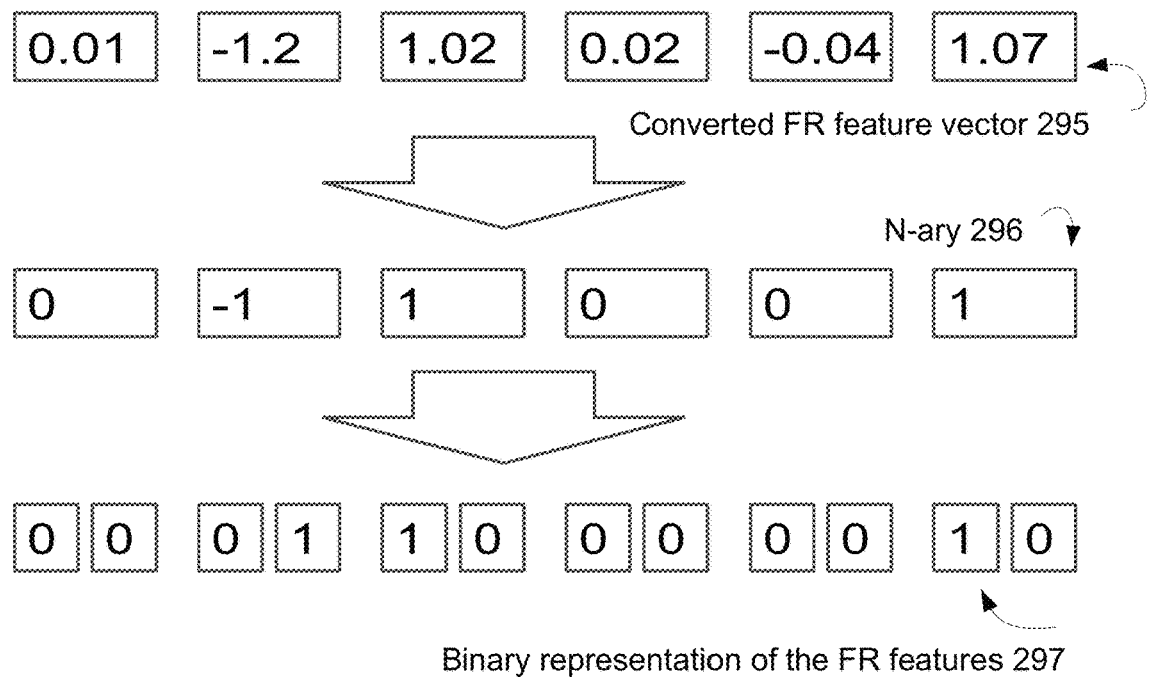
FIG. 6 illustrates an example of a conversion.

The top part of FIG. 6 illustrates an example of a converted FR feature vector 295 that is a semi-trinary converted FR feature vector that is converted to a N-ary representation 296 that is trinary representation of the FR features. The trinary representation of the FR features is then converted to a binary representation of the FR features 297 in which each trinary value is encoded by a pair of binary bits.

According to an embodiment of the invention, the soft function is not applied on the multiple FR feature elements, and a binary representation of the face recognition features based on the FR feature vector.

Figure 7:
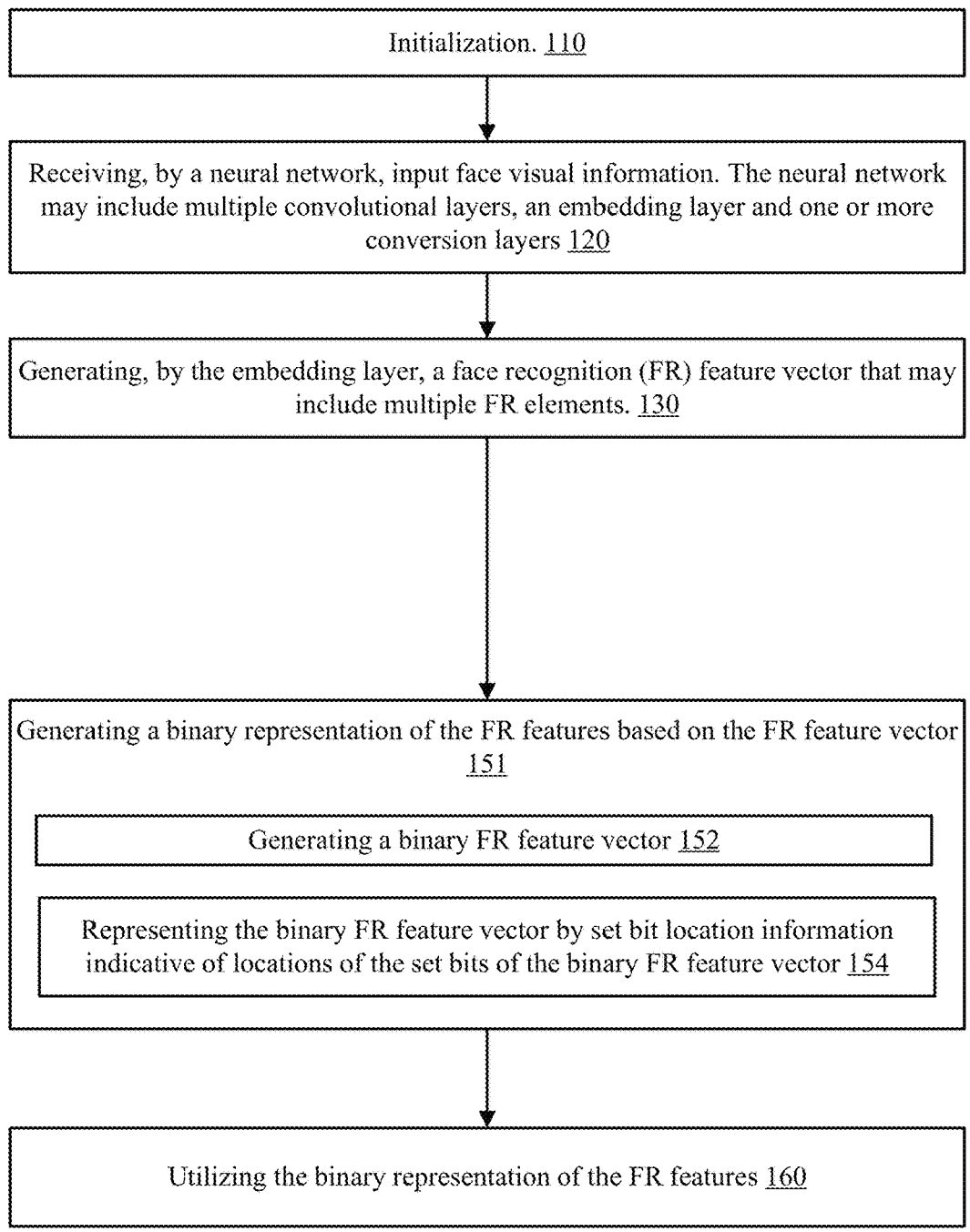
FIG. 7 illustrates an example of a method.

FIG. 7 illustrates method 101.

Method 101 starts by steps 110, followed by step 120 and followed by step 130.

Step 130 is followed by step 151 of generating a binary representation of the FR features based on the FR feature vector.

Step 151 may include step 152. Step 151 may also include step 154.

Step 150 may be followed by step 160.

Figure 8:
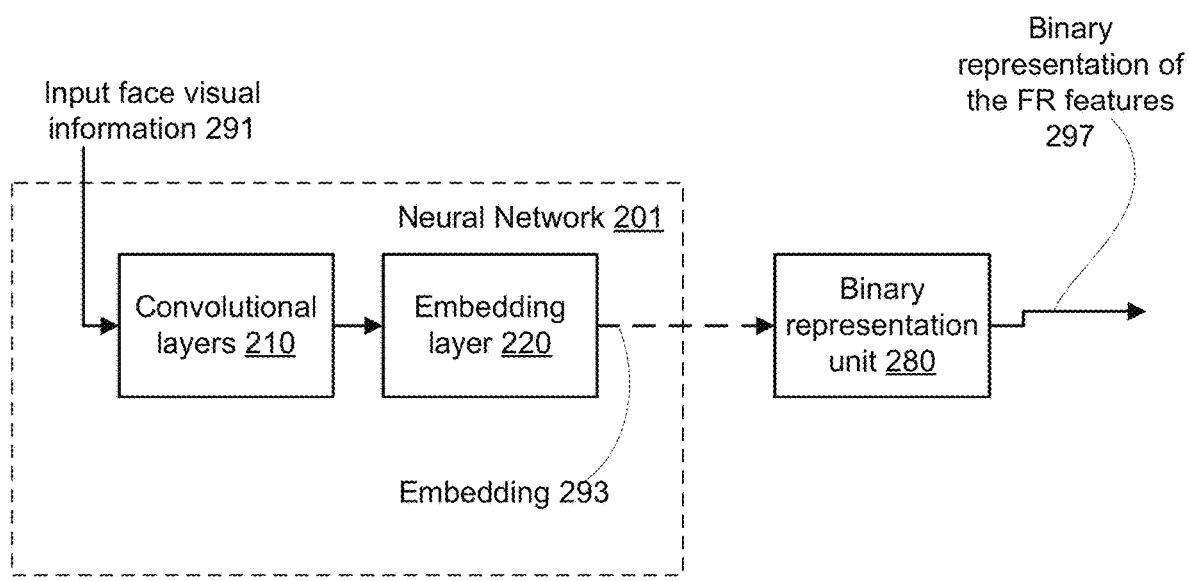
FIG. 8 illustrates an example of a generation of a binary representation of FR features.

FIG. 8 illustrates an example of a neural network 201 and a binary representation unit 280.

The neural network may be implemented by a processor such as a neural network processor, may be implemented as a set of commands, and the like.

The neural network 201 include convolutional layers 210 and an embedding layer 220. The neural network 201 may include additional layers. The neural network may receive input face visual information 291, the convolution layers 210 may be followed by an embedding layer 220 that outputs FR feature vector that may include multiple FR feature elements such as embedding 293. The binary representation unit 280 may receive the embedding 293 and generate a binary representation of the FR features 297.

Figure 9:
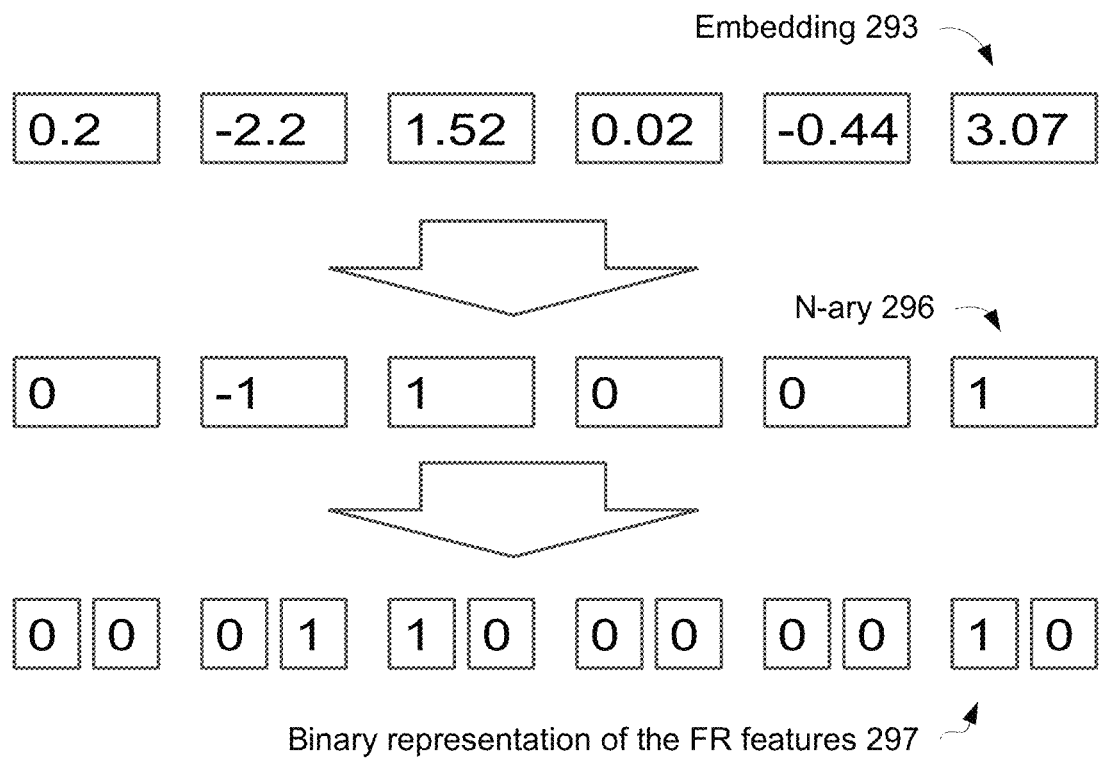
FIG. 9 illustrates an example of a conversion.

FIG. 9 illustrates an example of an embeddings 293 that is converted to a N-ary representation 296 that is trinary representation of the FR features. The trinary representation of the FR features is then converted to a binary representation of the FR features 297 in which each trinary value is encoded by a pair of binary bits.

The process illustrated in FIG. 9 may be less accurate that the process illustrated in FIG. 6 as (a) the differences between the values of the embeddings and the trinary representation may exceed (b) the differences between the semi-trinary values and the trinary representation.

The binary representation of the FR features (such as a compact binary representation of FR features, such as the set bit location information) may be compared to multiple reference binary representations of the FR features (such as a reference compact binary representations of FR features, such as the reference set bit locations information) to find one or more similar reference binary representations of the FR features.

Finding more than a single similar reference binary representations of the FR features is possible as the similarly criterion may allow some deviations between the binary representation of the FR features and a similar reference binary representation of the FR features.

For example—similarity may be obtained even when there is a mismatch between set bits (for example up to a few mismatches, up to a few percents of mismatches—for example up to 5, 10, 15 mismatches—or any other value). The number of mismatches provide a tradeoff between accuracy and noise immunity.

When multiple similar reference binary representations of the FR features are found—the search may continue by selecting one of the multiple similar reference binary representations of the FR features. The selection may include comparing between the entire binary representations of the FR features. The selection may also include comparing between the embeddings (before binarization)—to find the best result.

Figure 10:
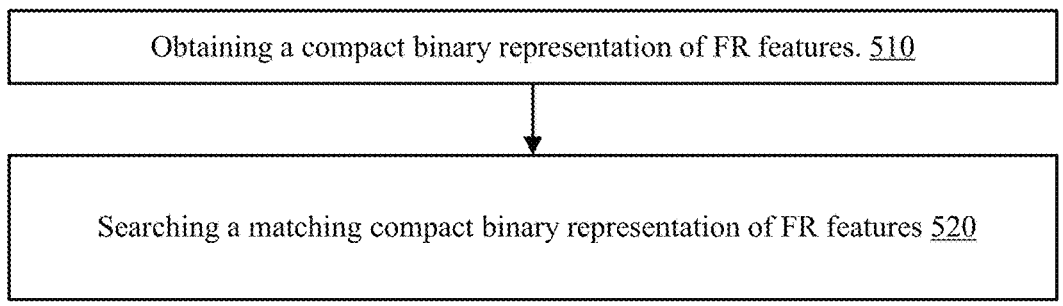
FIG. 10 illustrates an example of a method.

FIG. 10 illustrates an example of method 500.

Method 500 may start by step 510 of obtaining a compact binary representation of FR features. This may include receiving the compact binary representation of FR features or generating the compact binary representation of FR features.

The compact binary representation of FR features may be generated by any one of methods 100 and 101.

The compact binary representation of FR features may be, for example, a set bit location information indicative of locations of the set bits of the binary FR feature vector, or any output of method 100 and/or method 101.

Step 510 may be followed by step 520 searching a matching compact binary representation of FR features.

Step 520 may include selecting between multiple reference matching compact binary representation of FR features—when multiple reference matching compact binary representation of FR features are found—for example by searching for the closest reference binary representation of FR features. Any other criteria may be selected.

The search can be made in a data structure that stores multiple compact binary representation of FR features.

The search may include one or more phases.

Figure 11:
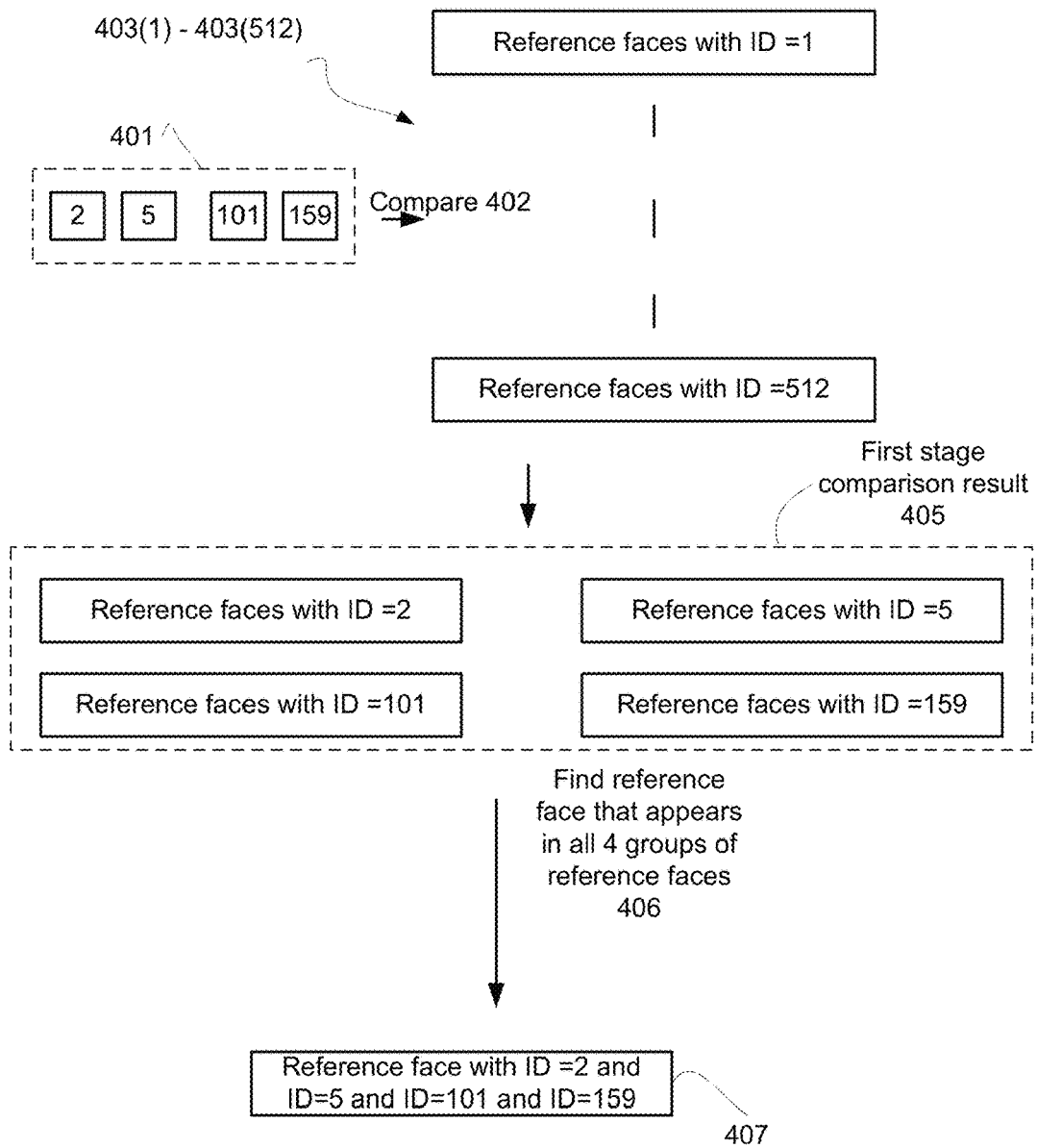
FIG. 11 illustrates an example of a search process.

FIG. 11 illustrates an example of a search process 400. It is assumed that there are 512 FR features and that the compact binary representation of FR features is set bit location information.

The search process 400 includes two phases:

During a first phase (denoted "compare 402") a query set bit location information 401 (in this case the set bits are the second, the fifth, the one hundred and tenth, and the one hundredth and fifty ninth bits) is compared against 512 lists (401(1)-403(512)) of reference set bit location information that are identified by including a certain set bit to provide a first stage comparison results—in the example of FIG. 11—there are four lists—that correspond to the 2'nd set bit, 5'th set bit, 101'th set bit and 159'th set bit.

During a second phase (406) searching for a single reference face (407) that appears in all lists of the first stage comparison results—to provide reference face with exactly the 2'nd set bit, 5'th set bit, 101'th set bit and 159'th set bit.

Figure 12:
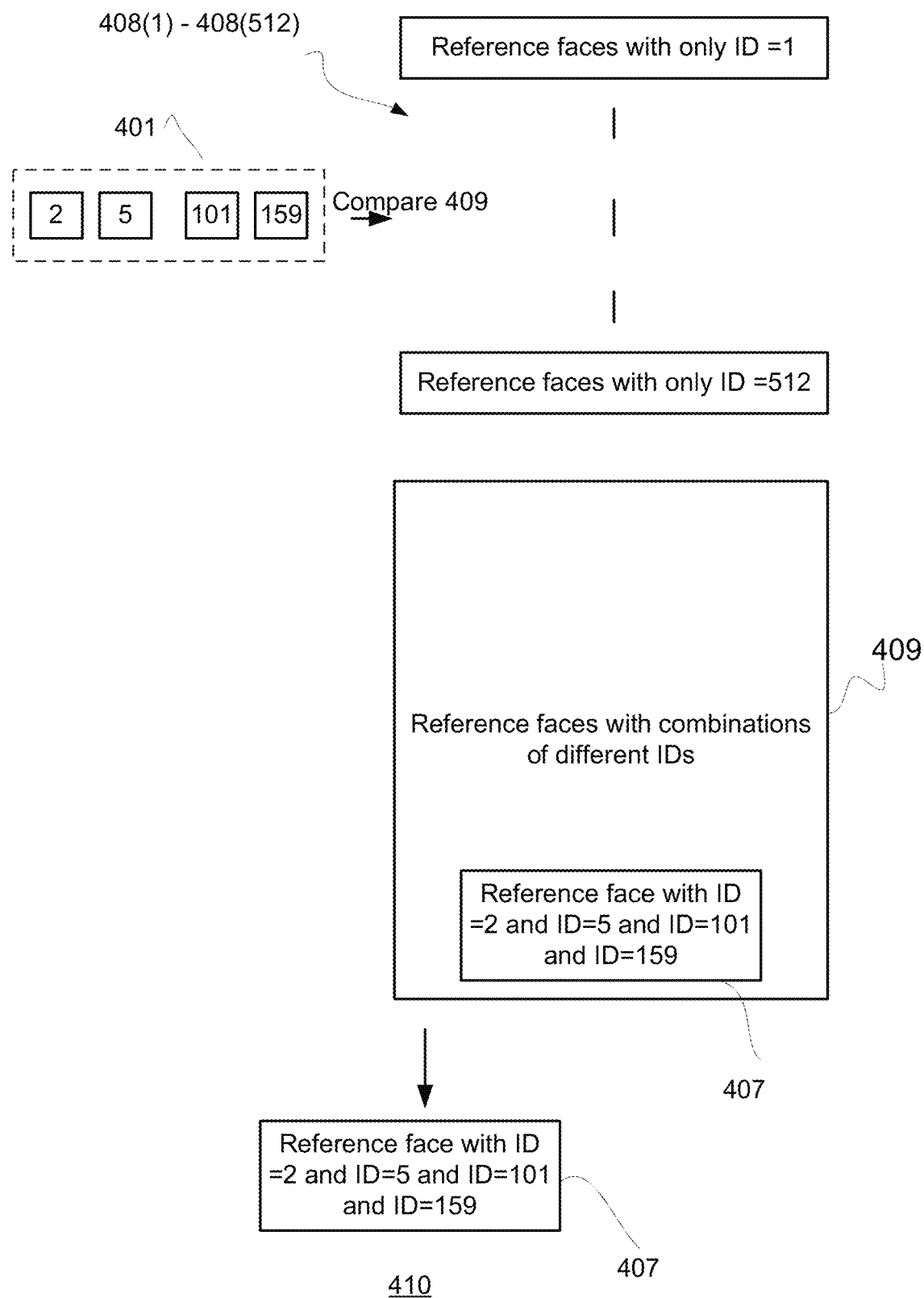
FIG. 12 illustrates an example of a search process.

FIG. 12 illustrates an example of a search process 410. It is assumed that there are 512 FR features and that the compact binary representation of FR features is set bit location information.

The search process 400 includes a single phase of comparing a query set bit location information 401 (in this case the set bits are the second, the fifth, the one hundred and tenth, and the one hundredth and fifty ninth bits) against (a) 512 lists (408(1)-408(512)) of reference set bit location information that are identified by including only a single certain set bit, and against reference set bit location information that are identified by including combinations of multiple certain set bit (denoted 409)—the in the example also include the single reference face (407) with exactly the 2'nd set bit, 5'th set bit, 101'th set bit and 159'th set bit—which the search result.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for compact representation of face recognition features, the method comprises:
   receiving, by a neural network, input face visual information; wherein the neural network comprises multiple convolutional layers, an embedding layer and one or more conversion layers;
   generating, by the embedding layer, a face recognition (FR) feature vector that comprises multiple FR feature elements;
   applying a soft function on the multiple FR feature elements, by the one or more conversion layers, to provide a converted FR feature vector that comprises multiple converted FR feature elements that are non-binary; wherein each FR feature element is associated with a FR feature element probability density function, each converted FR feature element is associated with a converted FR feature element probability density function, the converted FR feature element probability density function has a higher distribution function density within a first distance from each integer of multiple evenly distributed integers in relation to the FR feature element probability density function, wherein the first distance is less than twenty precent a distance between adjacent integers; and
   generating a binary representation of the face recognition features based on the converted FR feature vector.

2. The method according to claim 1 wherein the multiple evenly distributed integers comprise at least three evenly distributed integers.

3. The method according to claim 1 wherein the generating of the binary representation comprises generating a binary FR feature vector.

4. The method according to claim 3 wherein the generating of the binary representation comprises representing the binary FR feature vector by set bit location information indicative of locations of the set bits of the binary FR feature vector.

5. The method according to claim 4 wherein the multiple discrete values are zero and one.

6. The method according to claim 2 wherein the multiple discrete values are minus one, zero and one.

7. The method according to claim 6 wherein the generating of the binary representation comprises generating a trinary FR feature vector, and converting the trinary feature vector to a binary FR feature vector.

8. The method according to claim 1 wherein the generating of the binary representation of the input face visual information is executed by an entity that does not belong to the neural network.

9. The method according to claim 1 comprising performing a supervised training of the neural network, wherein the supervised training comprises feeding converted FR feature vectors generated by the neural network to an additional neural network, wherein an output of the additional neural network is fed to a loss function.

10. The method according to claim 1 comprising:
   searching for a matching reference face out of multiple reference faces that are represented by reference binary representations of face recognition features;
   identifying that there are a plurality of matching reference binary representations of face recognition features; and
   selecting one of the plurality of matching reference binary representations of face recognition features based on values of a plurality of face recognition feature vectors that are associated with the plurality of matching reference binary representations of face recognition features.

11. A non-transitory computer readable medium that stores instructions for:
   receiving, by a neural network, input face visual information; wherein the neural network comprises multiple convolutional layers, an embedding layer and one or more conversion layers;
   generating, by the embedding layer, a face recognition (FR) feature vector that comprises multiple FR feature elements;
   applying a soft function on the multiple FR feature elements, by the one or more conversion layers, to provide a converted FR feature vector that comprises multiple converted FR feature elements that are non-binary, wherein each FR feature element is associated with a FR feature element probability density function, each converted FR feature element is associated with a converted FR feature element probability density function, the converted FR feature element probability density function has a higher distribution function density within a first distance from each integer of multiple evenly distributed integers in relation to the FR feature element probability density function, wherein the first distance is less than twenty precent of a distance between adjacent integers; and
   generating a binary representation of the face recognition features based on the converted FR feature vector.

12. The non-transitory computer readable medium according to claim 11 wherein the multiple evenly distributed integers comprise at least three evenly distributed integers.

13. The non-transitory computer readable medium according to claim 11 wherein the generating of the binary representation comprises generating a binary FR feature vector.

14. The non-transitory computer readable medium according to claim 13 wherein the generating of the binary representation comprises representing the binary FR feature vector by set bit location information indicative of locations of the set bits of the binary FR feature vector.

15. The non-transitory computer readable medium according to claim 14 wherein the multiple discrete values are zero and one.

16. The non-transitory computer readable medium according to claim 12 wherein the multiple discrete values are minus one, zero and one.

17. The non-transitory computer readable medium according to claim 16 wherein the generating of the binary representation comprises generating a trinary FR feature vector, and converting the trinary feature vector to a binary FR feature vector.

18. The non-transitory computer readable medium according to claim 11 wherein the generating of the binary representation of the input face visual information is executed by an entity that does not belong to the neural network.

19. The non-transitory computer readable medium according to claim 11 comprising performing a supervised training of the neural network, wherein the supervised training comprises feeding converted FR feature vectors generated by the neural network to an additional neural network, wherein an output of the additional neural network is fed to a loss function.

20. The non-transitory computer readable medium according to claim 11 comprising:
searching for a matching reference face out of multiple reference faces that are represented by reference binary representations of face recognition features;
identifying that there are a plurality of matching reference binary representations of face recognition features; and
selecting one of the plurality of matching reference binary representations of face recognition features based on values of a plurality of face recognition feature vectors that are associated with the plurality of matching reference binary representations of face recognition features.

21. A method for utilizing a compact binary representation of face recognition features, the method comprises:
obtaining the compact binary representation of face recognition (FR) features; and
utilizing the compact binary representation of FR features;
wherein the compact binary representation of FR features is generated by:
applying a soft function on the multiple FR feature elements, by the one or more conversion layers, to provide a converted FR feature vector that comprises multiple converted FR feature elements that are non-binary, wherein each FR feature element is associated with a FR feature element probability density function, each converted FR feature element is associated with a converted FR feature element probability density function, the converted FR feature element probability density function has a higher distribution function density within a first distance from each integer of multiple evenly distributed integers in relation to the FR feature element probability density function, wherein the first distance is less than twenty precent of a distance between adjacent integers; and
generating a binary representation of the face recognition features based on the converted FR feature vector.

* * * * *